(12) United States Patent
Carr et al.

(10) Patent No.: US 11,963,917 B2
(45) Date of Patent: Apr. 23, 2024

(54) INTERFACING WHEELCHAIRS WITH WHEELED APPARATUSES

(71) Applicants: Kevin Jon Carr, Chatfield, MN (US); Cody Randall Schmidt, Rochester, MN (US); Nicholas Aaron Elliott, Rochester, MN (US)

(72) Inventors: Kevin Jon Carr, Chatfield, MN (US); Cody Randall Schmidt, Rochester, MN (US); Nicholas Aaron Elliott, Rochester, MN (US)

( * ) Notice: Subject to any disclaimer, the term of this patent is extended or adjusted under 35 U.S.C. 154(b) by 0 days.

(21) Appl. No.: 17/961,753

(22) Filed: Oct. 7, 2022

(65) Prior Publication Data

US 2023/0109303 A1    Apr. 6, 2023

Related U.S. Application Data

(63) Continuation of application No. 16/777,587, filed on Jan. 30, 2020, now Pat. No. 11,464,689.

(60) Provisional application No. 62/800,243, filed on Feb. 1, 2019.

(51) Int. Cl.
*A61G 5/10* (2006.01)
*B62B 3/02* (2006.01)
*B62B 3/14* (2006.01)

(52) U.S. Cl.
CPC .............. *A61G 5/10* (2013.01); *B62B 3/02* (2013.01); *B62B 3/1472* (2013.01); *B62B 2207/02* (2013.01)

(58) Field of Classification Search
CPC .......... A61G 5/10; B62B 3/02; B62B 3/1472; B62B 2207/02
See application file for complete search history.

(56) References Cited

U.S. PATENT DOCUMENTS

| | | | | |
|---|---|---|---|---|
| 3,208,768 A | * | 9/1965 | Hulbert | B60D 1/00 280/79.11 |
| 3,434,566 A | * | 3/1969 | Miller | E06C 5/02 182/15 |
| 3,524,512 A | | 8/1970 | Voeks et al. | |
| 3,834,565 A | * | 9/1974 | Goodman, Jr. | B60P 1/43 296/61 |
| 4,132,323 A | * | 1/1979 | Simmons | B60P 3/062 280/789 |
| 4,854,803 A | * | 8/1989 | Coccaro | B60B 29/002 74/577 M |
| 4,904,146 A | * | 2/1990 | Lock | B60P 3/125 280/402 |
| 4,913,459 A | * | 4/1990 | Smeitink | B66F 7/246 414/537 |
| 5,112,070 A | * | 5/1992 | Hahn | B66F 5/02 29/244 |

(Continued)

FOREIGN PATENT DOCUMENTS

EP        0848939        6/1998

*Primary Examiner* — Erez Gurari
(74) *Attorney, Agent, or Firm* — Fish & Richardson P.C.

(57) ABSTRACT

Devices described in this disclosure can interconnect a wheelchair with another wheeled apparatus. For example, this document describes interfacing devices that releasably receive the front wheels of a wheelchair and the rear wheels of another wheeled apparatus in such a way that a user of the wheelchair can conveniently maneuver the wheeled apparatus in conjunction with the operation of the wheelchair.

17 Claims, 12 Drawing Sheets

(56) References Cited

U.S. PATENT DOCUMENTS

| | | | |
|---|---|---|---|
| 5,207,286 A | 5/1993 | McKelvey | |
| 5,248,235 A * | 9/1993 | Poten | B66F 7/246 |
| | | | 280/43.11 |
| 5,342,162 A * | 8/1994 | Robinette | B60P 3/127 |
| | | | 414/537 |
| 5,352,083 A * | 10/1994 | Roberts | B60P 3/125 |
| | | | 280/402 |
| 5,599,031 A * | 2/1997 | Hodges | B62B 5/0083 |
| | | | 280/35 |
| 5,620,192 A * | 4/1997 | Demongin | B60S 13/00 |
| | | | 280/35 |
| 5,628,609 A * | 5/1997 | Nespor | F16B 7/105 |
| | | | 280/402 |
| 5,718,554 A * | 2/1998 | McElroy | B60P 1/6454 |
| | | | 414/500 |
| 6,325,168 B1 | 12/2001 | Hillel | |
| D468,512 S * | 1/2003 | Hernandez | B66F 5/04 |
| | | | D34/28 |
| 6,543,985 B1 * | 4/2003 | Harstad | B60P 3/062 |
| | | | 414/537 |
| 6,702,313 B2 | 3/2004 | Forshee et al. | |
| 6,766,871 B2 | 7/2004 | Sawyer | |
| 6,834,882 B1 * | 12/2004 | Boyd | B60P 3/122 |
| | | | 280/789 |
| 6,860,496 B2 * | 3/2005 | Novak | B62B 5/049 |
| | | | 414/469 |
| 7,093,841 B2 * | 8/2006 | Conrad | B62B 5/085 |
| | | | 280/33.993 |
| 7,097,406 B1 * | 8/2006 | Gang | B60B 29/002 |
| | | | 254/105 |
| 7,111,908 B1 * | 9/2006 | Mills | B60P 1/00 |
| | | | 298/22 J |
| D532,575 S * | 11/2006 | Oberg | D34/28 |
| 7,597,332 B2 * | 10/2009 | Thompson | B62B 7/00 |
| | | | 280/47.38 |
| 7,658,587 B1 * | 2/2010 | Dierks | B60P 3/066 |
| | | | 296/184.1 |
| 9,108,463 B2 * | 8/2015 | Winters | B60B 30/10 |
| 9,796,568 B1 * | 10/2017 | Gonzales | F16M 11/32 |
| 9,845,125 B1 * | 12/2017 | Liu | B62B 5/0083 |
| 10,279,827 B1 * | 5/2019 | Mason | B60B 29/002 |
| 10,507,856 B1 * | 12/2019 | Malson | B62B 1/208 |
| 10,632,787 B1 * | 4/2020 | Goetsch | B62B 3/0606 |
| D897,065 S * | 9/2020 | Goetsch | D34/28 |
| D920,620 S * | 5/2021 | Coccaro | D34/23 |
| 11,464,689 B2 | 10/2022 | Carr et al. | |
| 11,780,608 B2 * | 10/2023 | Winters | B60P 3/11 |
| | | | 410/44 |
| 2002/0004961 A1 * | 1/2002 | Nishina | B60S 3/042 |
| | | | 15/53.4 |
| 2002/0093179 A1 * | 7/2002 | McKelvey | B62B 5/08 |
| | | | 280/639 |
| 2004/0052625 A1 * | 3/2004 | Butterfield | B60P 1/435 |
| | | | 414/537 |
| 2004/0146384 A1 * | 7/2004 | Whelan | B60S 13/00 |
| | | | 414/426 |
| 2006/0103094 A1 * | 5/2006 | Wiff | B60D 1/00 |
| | | | 280/79.11 |
| 2006/0182580 A1 * | 8/2006 | Petersen | B60P 1/6454 |
| | | | 414/538 |
| 2009/0123260 A1 * | 5/2009 | Howard-Leicester | B60P 3/122 |
| | | | 414/475 |
| 2009/0155034 A1 * | 6/2009 | Fonseca, Jr. | B60P 3/077 |
| | | | 14/71.1 |
| 2011/0020100 A1 * | 1/2011 | Kirby | B60P 3/1058 |
| | | | 414/480 |
| 2014/0097597 A1 * | 4/2014 | Coleraine | B62B 7/08 |
| | | | 280/47.4 |
| 2015/0217787 A1 * | 8/2015 | Luddeneit | G06Q 20/3276 |
| | | | 414/541 |
| 2016/0347339 A1 * | 12/2016 | Horvath | B62B 5/082 |
| 2017/0095114 A1 * | 4/2017 | O'Shaughnessy | B62B 3/02 |
| 2019/0031394 A1 * | 1/2019 | Millhouse | B65D 19/42 |
| 2020/0130719 A1 * | 4/2020 | Saeli | B62B 3/02 |
| 2020/0189674 A1 * | 6/2020 | Dove | B60P 1/435 |
| 2020/0246206 A1 * | 8/2020 | Carr | B62B 5/002 |

* cited by examiner

INTERFACING WHEELCHAIRS WITH WHEELED APPARATUSES

CROSS-REFERENCE TO RELATED APPLICATIONS

This application is a continuation of U.S. patent application Ser. No. 16/777,587, filed Jan. 30, 2020, and claims the benefit of U.S. Provisional Application Ser. No. 62/800,243, filed Feb. 1, 2019. The disclosure of the prior application is considered part of (and is incorporated by reference in) the disclosure of this application.

BACKGROUND

1. Technical Field

This document relates to devices that can interconnect a wheelchair with another wheeled apparatus, and methods for their use. For example, this document relates to devices that releasably receive the front wheels of a wheelchair and the rear wheels of another wheeled apparatus in such a way that a user of the wheelchair can conveniently maneuver the wheeled apparatus in conjunction with the operation of the wheelchair.

2. Background Information

A wheelchair is a wheeled mobility device in which the user sits. The device is propelled either manually (by turning the wheels by the hand) or via various automated systems. Wheelchairs are used by people for whom walking is difficult or impossible due to illness (physiological or physical), injury, or disability. There are an estimated 3.3 million wheelchair users in the United States, and the number is increasing every year.

A wheelchair can assist people to become more mobile and independent. However, some common tasks that are routine for people that can walk can be difficult for a wheelchair user. One such example is grocery shopping. To grocery shop using a grocery cart, the user of a wheelchair needs to simultaneously control both the wheelchair and the grocery cart. Such an endeavor is very difficult, if not nearly impossible, to perform.

SUMMARY

This document describes devices that can interconnect a wheelchair with another wheeled apparatus, and methods for their use. For example, this document describes devices that releasably receive the front wheels of a wheelchair and the rear wheels of another wheeled apparatus in such a way that a user of the wheelchair can conveniently maneuver the wheeled apparatus in conjunction with the operation of the wheelchair.

In one aspect, this disclosure is directed to a device for interfacing a wheelchair with another wheeled apparatus. The device includes a frame, at least two casters attached to the frame, a first pair of ramps pivotably attached to and extending from a first side of the frame, and a second pair of ramps pivotably attached to and extending from a second side of the frame that is opposite of the first side of the frame.

Such a device for interfacing a wheelchair with another wheeled apparatus may optionally include one or more of the following features. The at least two casters may comprise four casters. The first pair of ramps may be arranged between a first pair of the four casters, and the second pair of ramps may be arranged between a second pair of the four casters. The first pair of ramps may be arranged between a first pair of the four casters, and a second pair of the four casters may be arranged between the second pair of ramps. Each ramp of the first and second pair of ramps may define a recess that can receive and retain a circular wheel. Each ramp of the first and second pair of ramps may include a planar surface. Each ramp of the first and second pair of ramps may be pivotably attached to the frame along a respective pivot axis. The respective pivot axis of each of the first and second pair of ramps may be located between the planar surface and the recess of each of the first and second pair of ramps. In some embodiments, one ramp of the first pair of ramps is wider than the other ramp of the first pair of ramps. In some embodiments, each ramp of the second pair of ramps is the same width. A width of the frame may be adjustable. A position of one or more ramps of the first and second pair of ramps may be adjustable relative to the frame.

In another aspect, this disclosure is directed to a method of interfacing a wheelchair with another wheeled apparatus. The method includes: (a) engaging front casters of the wheelchair with a first pair of pivotable ramps of an interfacing device such that: (i) the front casters reside in recesses defined by the first pair of pivotable ramps and (ii) the first pair of pivotable ramps pivot in relation to a frame of the interfacing device because of force exerted by the front casters against the first pair of pivotable ramps; and (b) engaging wheels of the wheeled apparatus with a second pair of pivotable ramps of the interfacing device such that: (i) the wheels reside in recesses defined by the second pair of pivotable ramps and (ii) the second pair of pivotable ramps pivot in relation to the frame of the interfacing device because of force exerted by the wheels against the second pair of pivotable ramps.

Such a method may optionally include one or more of the following features. The engaging the front casters of the wheelchair with the first pair of pivotable ramps of the interfacing device may result in the front casters leaving contact with a floor on which the wheelchair, the interfacing device, and the wheeled apparatus reside. The engaging the wheels of the wheeled apparatus with the second pair of pivotable ramps of the interfacing device may result in the wheels leaving contact with the floor. The wheeled apparatus may be selected from the group consisting of: a shopping cart, a baby stroller, a lawn mower, a wagon, and a snow blower. The wheelchair may be a motorized wheelchair or a manually-powered wheelchair. The method may also include, prior to the engaging the wheels of the wheeled apparatus with the second pair of pivotable ramps of the interfacing device, adjusting a width of the frame to equalize a spacing of the second pivotable ramps with a spacing of the wheels of the wheeled apparatus.

Particular embodiments of the subject matter described in this document can be implemented to realize one or more of the following advantages. In some embodiments, the devices and methods described herein can allow wheelchair users to conveniently operate another wheeled apparatus (e.g., a shopping cart, baby stroller, lawnmower, etc.). Such a result can add to the independence and productivity of a wheelchair user in a satisfying and advantageous manner. Stores that provide shopping carts can choose to provide the devices described herein as a means of encouraging wheelchair users to shop there. Other advantages can be identified in view of the detailed descriptions of the devices and methods provided herein.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

Like reference numbers represent corresponding parts throughout.

DETAILED DESCRIPTION

This document describes devices that can interconnect a wheelchair with another wheeled apparatus, and methods for their use. For example, this document describes devices that releasably receive the front wheels of a wheelchair and the rear wheels of another wheeled apparatus in such a way that a user of the wheelchair can conveniently maneuver the wheeled apparatus in conjunction with the operation of the wheelchair.

Figure 1:
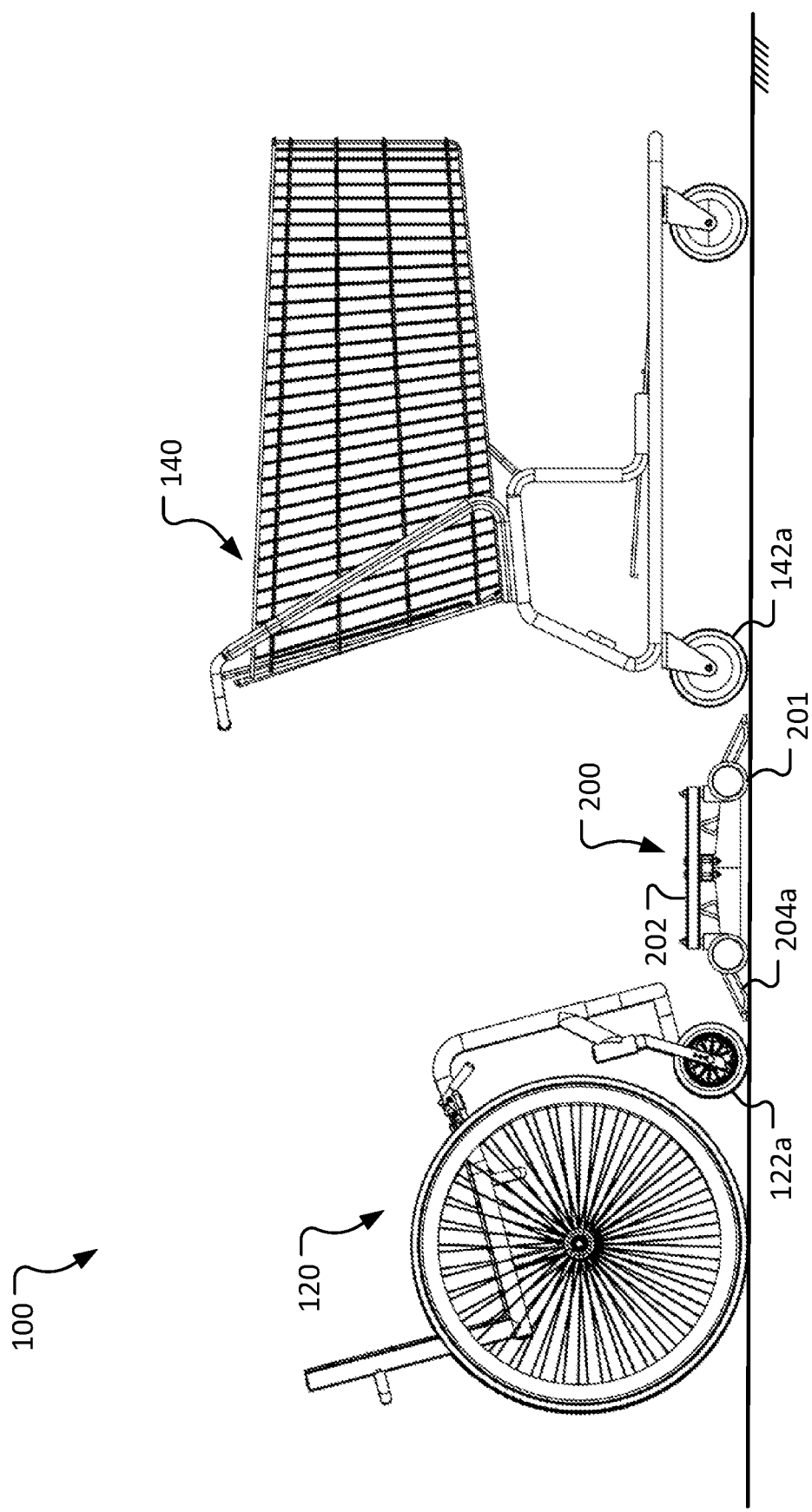
FIGS. 1 and 2 show (in a side view and a perspective view, respectively) a system including a wheelchair, a shopping cart, and an interfacing device in accordance with some embodiments provided herein. The system is shown in a first configuration in which the wheelchair, shopping cart, and interfacing device are unengaged from each other.
Figure 2:
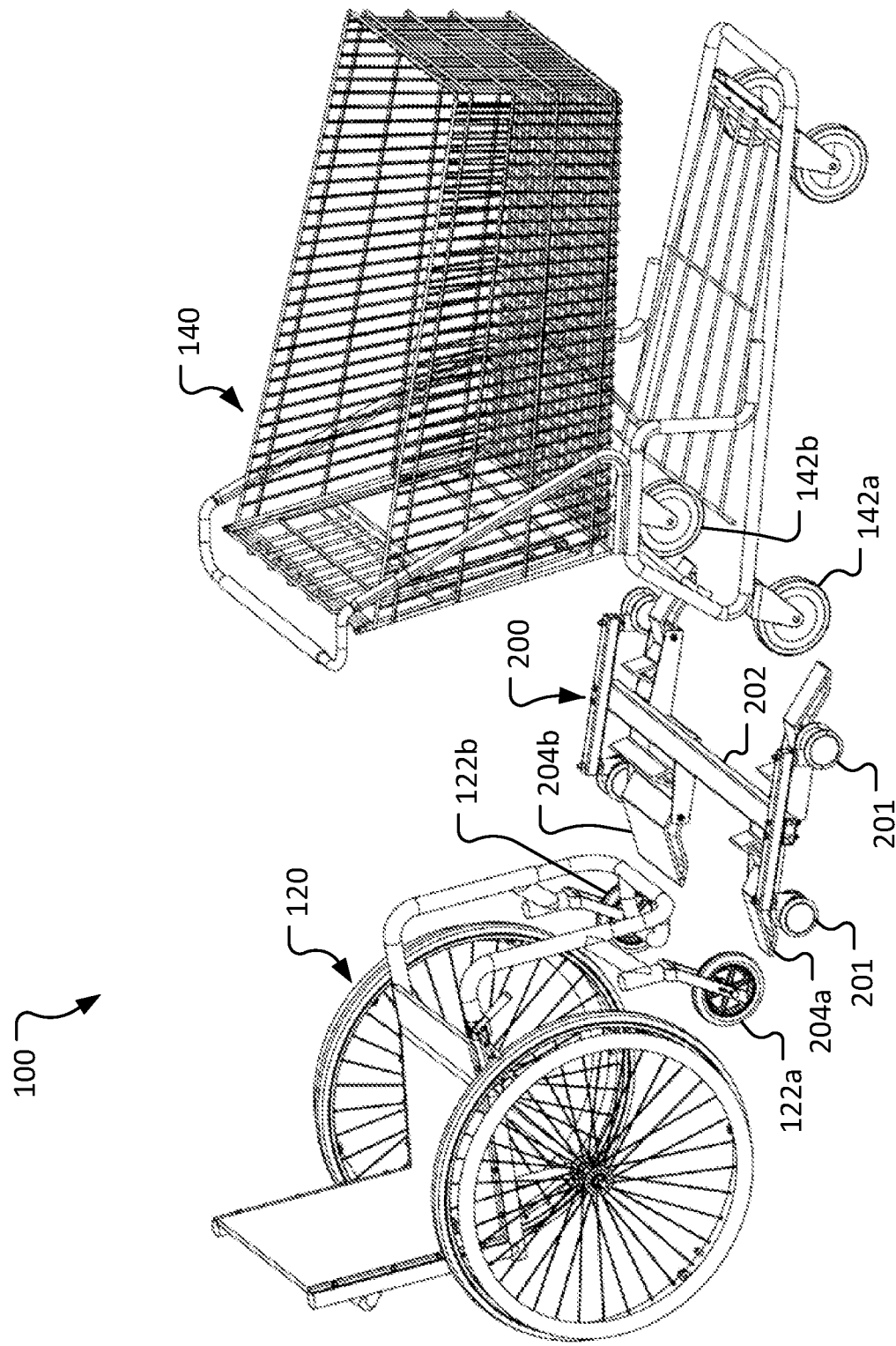

Referring to FIGS. 1 and 2, an example system 100 includes an example wheelchair 120, an example wheeled apparatus 140, and an example interfacing device 200. In the depicted configuration of system 100, the wheelchair 120, the wheeled apparatus 140, and the interfacing device 200 are each unengaged from each other, while resting/rolling on the same floor. As described further below, the wheelchair 120, the wheeled apparatus 140, and the interfacing device 200 can become engaged with each other so that a user of the wheelchair 120 can conveniently operate/maneuver the wheeled apparatus 140.

The wheelchair 120 can be any type of wheelchair. For example, the wheelchair 120 can be a motorized wheelchair or a manually-powered wheelchair. The wheelchair 120 can also represent a scooter. The wheelchair 120 includes front casters 122a and 122b.

The wheeled apparatus 140 can represent various types of apparatuses. In the depicted example, the wheeled apparatus 140 is an example shopping cart. However, the inventive concepts disclosed herein can be used to interface the wheelchair 120 with other types of wheeled apparatuses such as, but not limited to, a baby stroller, a lawn mower, a wagon, a snow blower, a wheeled-platform, a cart, and so on.

As described further below, the interfacing device 200 includes a frame 202 and at least two casters 201 attached to the frame 202. In the depicted example embodiment of the interfacing device 200, four casters 201 are attached to the frame 202. The casters 201 are wheels that can pivot 360° in relation to the frame 202.

The interfacing device 200 also includes a first pair of ramps 204a and 204b (or simply "ramps 204a-b") that extend from a first side of the frame 202. Each individual ramp 204a/204b of the first pair of ramps 204a-b is pivotably attached to the frame 202. In the depicted configuration, each individual ramp 204a/204b is arranged such that the outer edges of the ramps 204a-b are adjacent to or essentially touching the floor surface (e.g., as best seen in FIG. 1). In that arrangement, the ramps 204a-b are positioned to allowed the front casters 122a-b of the wheelchair 120 to be rolled up the ramps 204a-b to become engaged with the interfacing device 200.

Figure 3:
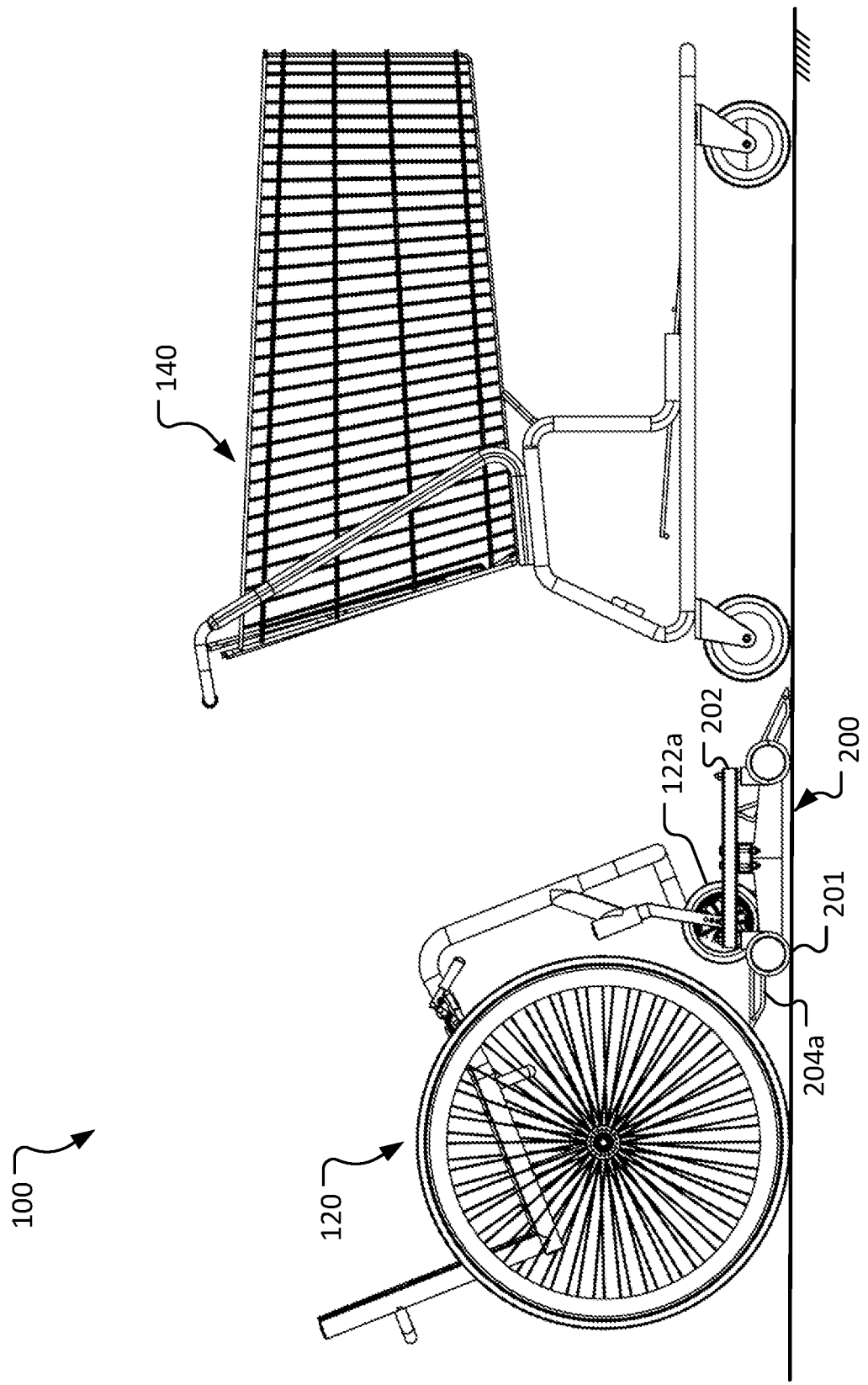
FIGS. 3 and 4 show (in a side view and a perspective view, respectively) the system of FIGS. 1 and 2 in a second configuration in which the wheelchair is engaged with the interfacing device while the shopping cart is unengaged from the interfacing device.
Figure 4:
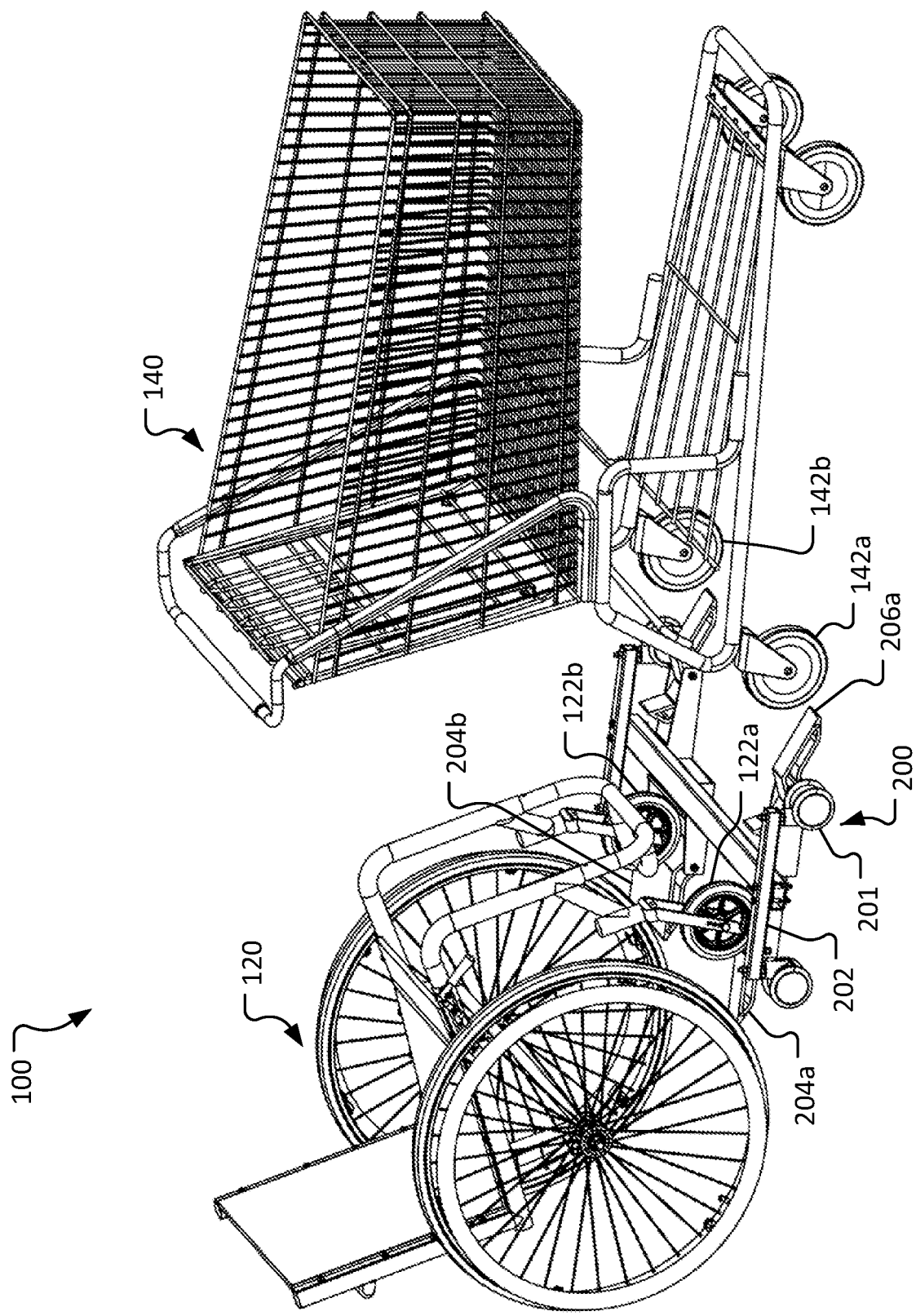

Referring to FIGS. 3 and 4, the system 100 can also be configured in a second configuration in which the wheelchair 120 is engaged with the interfacing device 200, while the wheeled apparatus 140 remains unengaged from the interfacing device 200.

The user of the wheelchair 120 can initiate engagement of the wheelchair 120 with the interfacing device 200 by rolling the front casters 122a-b of the wheelchair 120 up the ramps 204a-b of the interfacing device 200. When the force exerted by the front casters 122a-b onto the ramps 204a-b passes the pivot axes of the ramps 204a-b (the axes around which the ramps 204a-b pivot in relation to the frame 202), then the ramps 204a-b will pivot so that the outer edges of the ramps 204a-b are spaced above the floor surface (e.g., as best seen in FIG. 3). In that arrangement, the force exerted by the front casters 122a-b of the wheelchair 120 is being transferred to the floor via the frame 202 and, ultimately, the casters 201 of the interfacing device 200.

In this configuration, the front casters 122a-b of the wheelchair 120 are not in direct contact with the floor. Instead, the front casters 122a-b of the wheelchair 120 are positioned on, and are supported by, the interfacing device 200 (and the wheelchair 120 is tilted back slightly as a result). The casters 201 of the interfacing device 200 are, in turn, in direct contact with the floor. Accordingly, in this manner the casters 201 of the interfacing device 200 can essentially functionally replace the front casters 122a-b of the wheelchair 120, and the user of the wheelchair 120 can maneuver the engaged combination of the wheelchair 120 and the interfacing device 200 in much the same manner as the wheelchair 120 can be maneuvered alone. This functionality is beneficial for facilitating the next step that involves engaging the interfacing device 200 with the wheeled apparatus 140.

Figure 5:
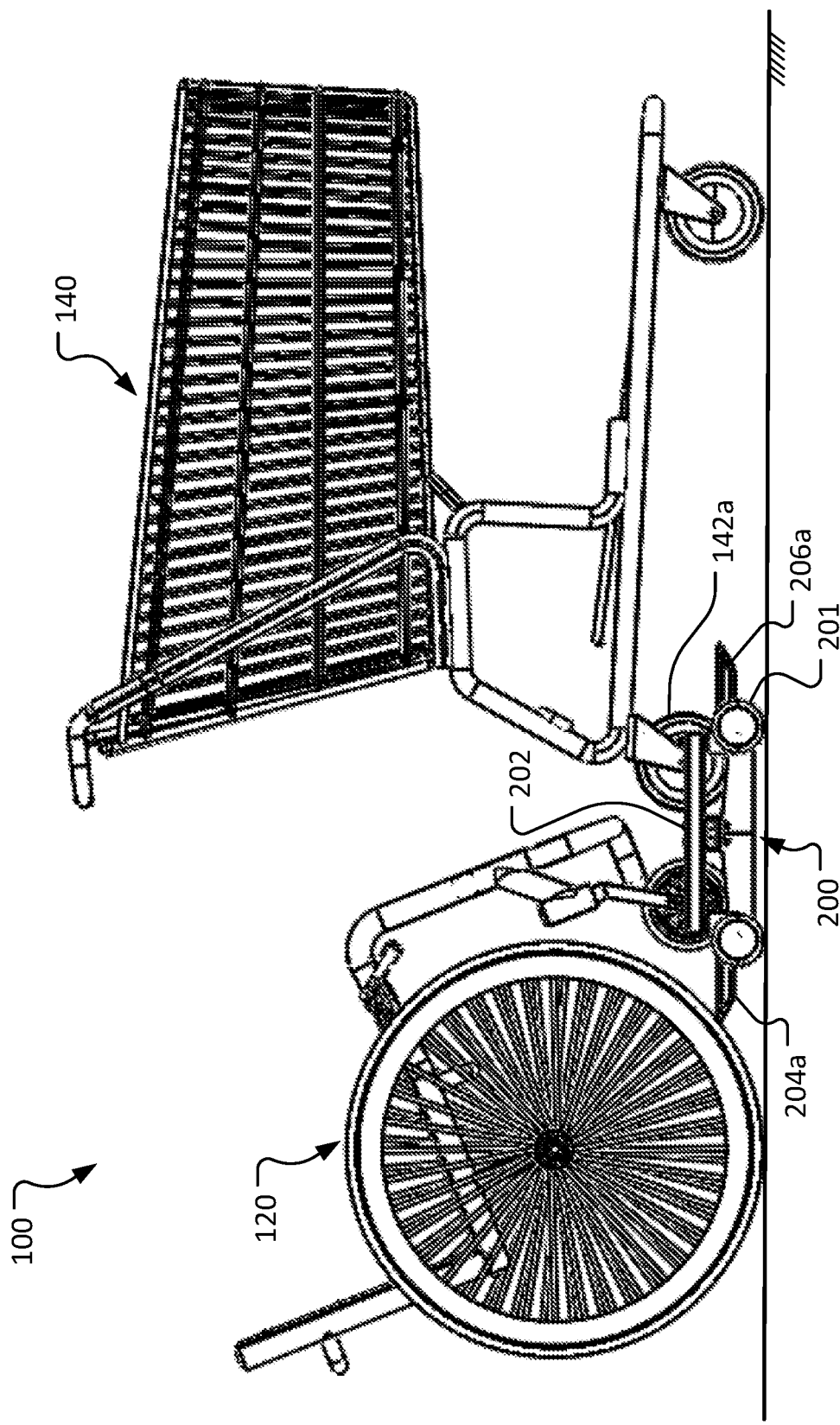
FIGS. 5 and 6 show (in a side view and a perspective view, respectively) the system of FIGS. 1 and 2 in a third configuration in which the wheelchair and the shopping cart are each engaged with the interfacing device.
Figure 6:
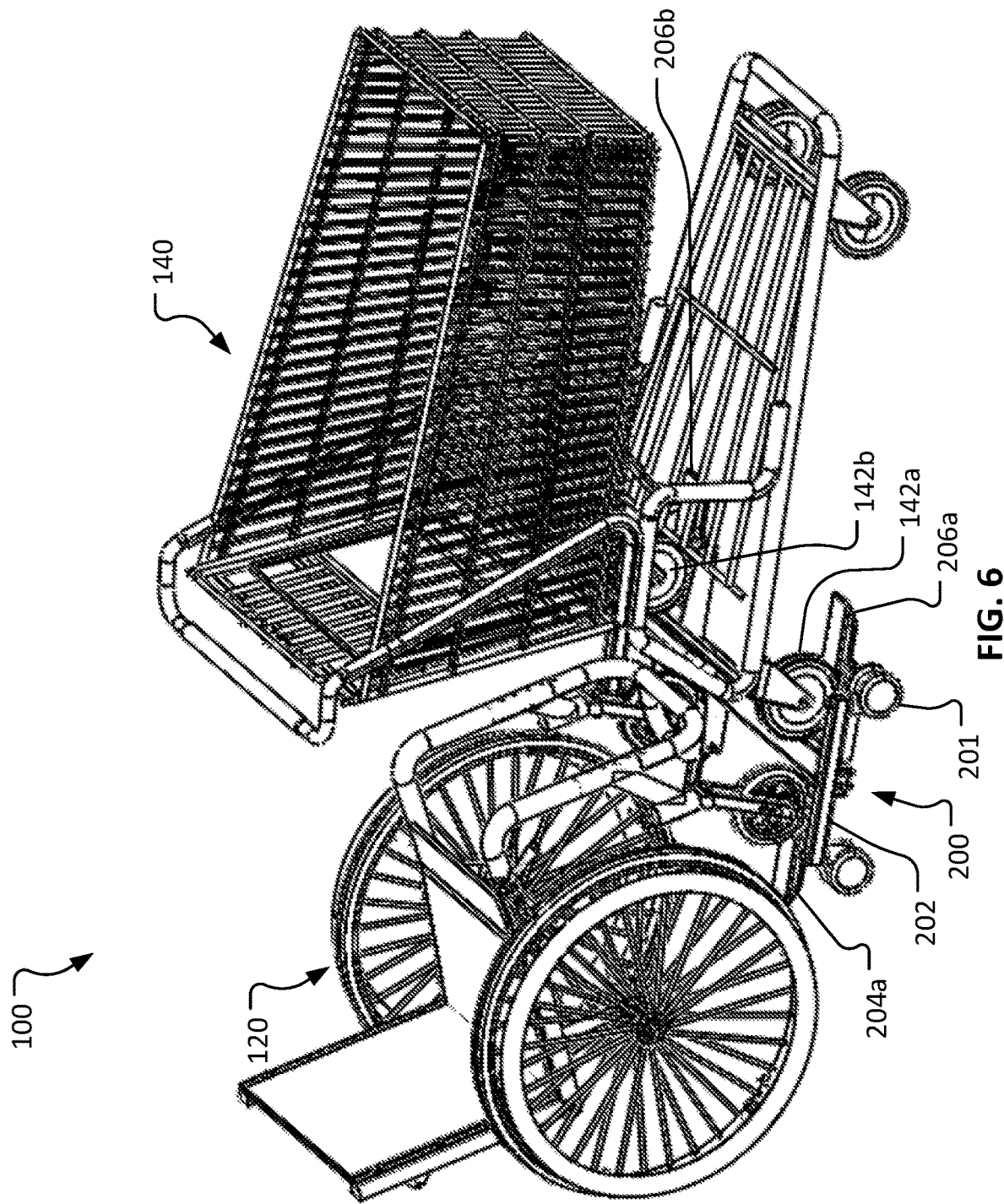

Referring to FIGS. 5 and 6, while the wheelchair 120 is engaged with the interfacing device 200 (or alternatively, while the wheelchair 120 is unengaged from the interfacing device 200), the wheeled apparatus 140 can become engaged with the interfacing device 200. In the depicted example, the rear wheels 142a and 142b of the wheeled apparatus 140 are engaged with the interfacing device 200.

The wheeled apparatus 140 can become engaged with the interfacing device 200 as shown by rolling the rear wheels 142a and 142b of the wheeled apparatus 140 up a second pair of ramps 206a and 206b (or simply "ramps 206a-b") that extend from a second side of the frame 202 that is opposite of the first side of the frame 202 (from where the first pair of ramps 204a-b extend).

In much the same manner as described above in reference to the engagement process of the front casters 122a-b of the wheelchair 120 with the interfacing device 200, when the forces from the rear wheels 142a and 142b of the wheeled apparatus 140 cross the pivot axes of the second pair of ramps 206a-b, the second pair of ramps 206a-b pivot in relation to the frame 202 such that the outer edges of the second pair of ramps 206a-b become spaced above the floor surface (e.g., as best seen in FIG. 5). In that arrangement, the force exerted by the rear wheels 142a and 142b of the wheeled apparatus 140 is being transferred to the floor via the frame 202 and, ultimately, the casters 201 of the interfacing device 200.

The depicted configuration of the system 100 (with both the wheelchair 120 and the wheeled apparatus 140 engaged with the interfacing device 200 such that the outer edges of the first ramps 204a-b and the second ramps 206a-b are out of contact with the floor) is the operative configuration (the most useful configuration for the user of the wheelchair 120 that wants to maneuver the wheeled apparatus 140). In this configuration, only the following components of the system 100 are in contact with the floor: (i) the rear wheels of the wheelchair 120, (ii) the casters 201 of the interfacing device 200, and (iii) the front wheels of the wheeled apparatus 140. In many cases, the front wheels of the wheeled apparatus 140 are casters (e.g., as in the example here in which the wheeled apparatus 140 is a shopping cart). Accordingly, except for the rear wheels of the wheelchair 120, all of the components of the example system 100 that are in contact with the floor are casters (in the depicted example, but not necessarily in all cases because some wheels can be in contact with the floor in some examples). It can be envisioned, therefore, that the user of the wheelchair 120 can readily maneuver the entire system 100 just by manipulating the rear wheels of the wheelchair 120 in much the same manner as the wheelchair 120 can be maneuvered normally (when it is not engaged with the interfacing device 200). In other words, the interfacing device 200 allows the user of the wheelchair 120 to mechanically couple with the wheeled apparatus 140 in a manner that enables the user to propel the wheeled apparatus 140 forward/backward, to steer it, to swing it side-to-side, and to otherwise maneuver the wheeled apparatus 140 in a manner that is very beneficial to the wheelchair user.

In some embodiments, additional securing devices may be included to detain the system 100 in the engaged configuration. For example, one or more safety straps can be used to secure the wheelchair 120 to the interfacing device 200 and/or to the wheeled apparatus 140. Similarly, in some cases one or more safety straps can be included to secure the wheeled apparatus 140 to the interfacing device 200 and/or to the wheelchair 120.

Figure 7:
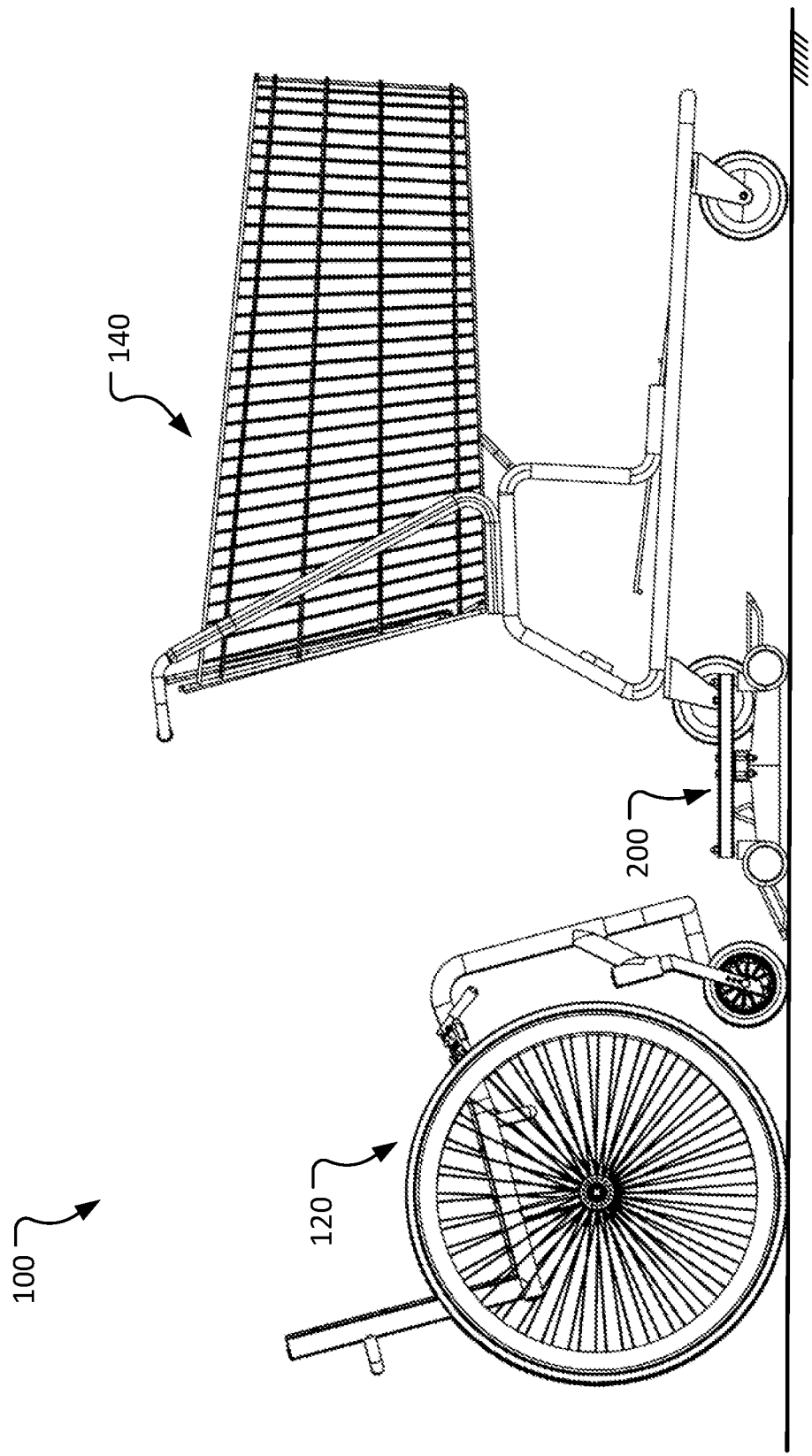
FIGS. 7 and 8 show (in a side view and a perspective view, respectively) the system of FIGS. 1 and 2 in a fourth configuration in which the shopping cart is engaged with the interfacing device while the wheelchair is unengaged from the interfacing device.
Figure 8:
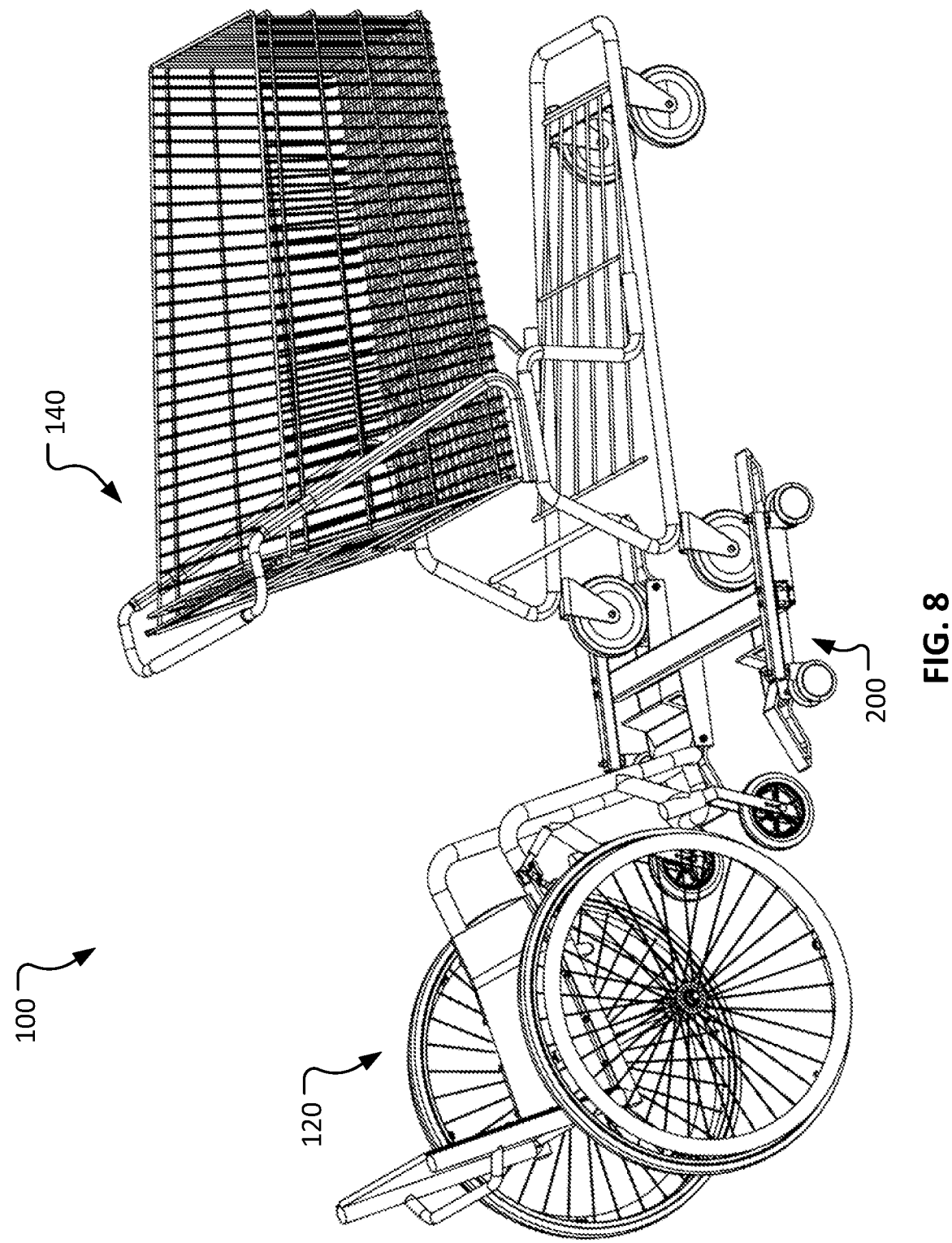

Referring to FIGS. 7 and 8, the system 100 also allows the user of the wheelchair 120 to disengage the wheelchair 120 from the interfacing device 200 while the wheeled apparatus 140 remains engaged with the interfacing device 200. Such an ability to disengage can be useful in some scenarios, such as in the following example.

In one example implementation, the wheeled apparatus 140 is a grocery-shopping cart (as depicted). Accordingly, while the wheelchair 120 and the shopping cart 140 are both engaged with the interfacing device 200, the user of the wheelchair 120 can maneuver the fully engaged system 100 around the aisles of a grocery store to shop for groceries in the typical manner. However, in some cases the user of the wheelchair 120 may need to (or simply want to) disengage from the interfacing device 200 to perform a task such as picking a grocery item from the shelf, display case, refrigeration cooler, or other. Thereafter, the user of the wheelchair 120 can re-engage the wheelchair 120 with the interfacing device 200 (and shopping cart 140) and resume moving the fully engaged system 100 about the grocery store aisles.

Figure 9:
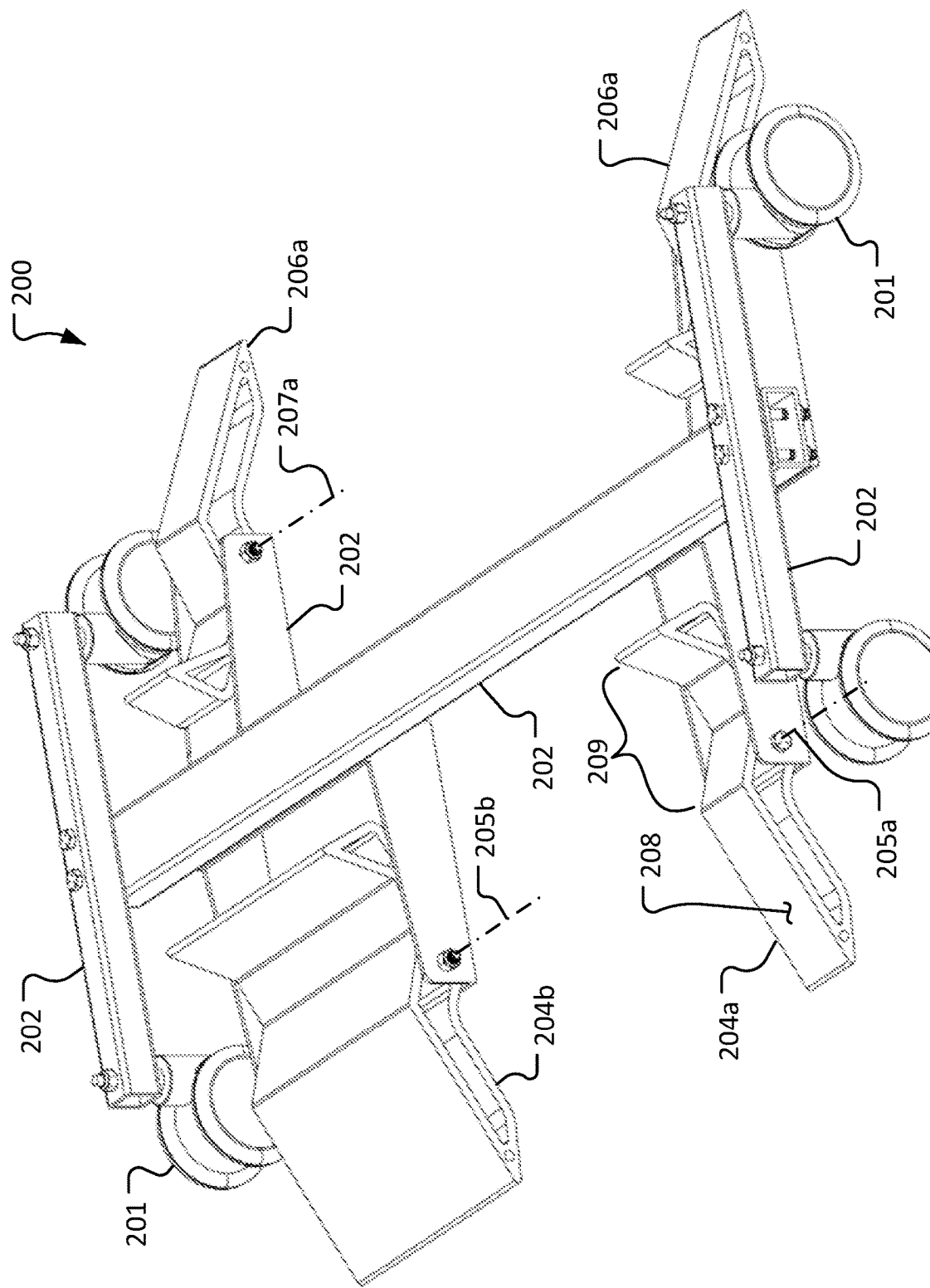
FIG. 9 shows a perspective view of an example interfacing device in accordance with some embodiments.

Referring to FIG. 9, the example interfacing device 200 is visible in greater detail here. The interfacing device 200 includes the frame 202 to which the casters 201 are mounted. In some embodiments, the frame 202 includes adjustment mechanisms to make a width of the frame 202 readily adjustable. In the depicted embodiment, the casters 201 can swivel 360°.

Pivotably mounted to the frame 202 are the first pair of ramps 204a-b and the second pair of ramps 206a-b. Each ramp of the ramps 204a-b and 206a-b is pivotably mounted to the frame 202 about a respective pivot axis (e.g., FIG. 9 explicitly shows a pivot axis 205a about which the first ramp 204a pivots, a pivot axis 205b about which the first ramp 204b pivots, and a pivot axis 207a about which the second ramp 206a pivots). In some embodiments, a side-to-side position of one or more of the ramps 204a-b and/or 206a-b in relation to the frame 202 is/are readily adjustable.

Each of the ramps 204a-b and 206a-b includes a planar surface and a recess that are arranged, generally, on opposite sides of the pivot axis. For example, first ramp 204a includes a planar surface 208 and a recess 209 that are arranged on opposite sides of the pivot axis 205a. The planar surfaces (e.g., the planar surface 208) are configured to function as ramps along which a wheel or caster of a wheelchair or wheeled apparatus can travel to get to/from the recess. The recesses (e.g., the recess 209) are configured to releasably receive and releasably detain a wheel or caster of a wheelchair or wheeled apparatus (as described above). The ramps 204a-b and 206a-b individually pivot in relation to the frame 202 (as described above) depending on whether a wheel or caster is within the recess of the individual ramp 204a-b and/or 206a-b. The frame 202 includes sidewalls that capture and contain the wheel or caster within the recess in side-to-side directions.

In the depicted example embodiment, the first ramp 204b is wider than the first ramp 204a. The additional width of the first ramp 204b allows the interfacing device 200 to accommodate (operatively engage with) a variety of wheelchairs that have differing side-to-side spacing of the wheelchair's front casters. In other words, the first ramp 204a is just wide enough such that a right front caster of the wheelchair can be positioned within the recess 209 (which accommodates a caster with a small amount of side-to-side clearance). Then, since the first ramp 204b is wider than a wheelchair caster, the left front caster of the wheelchair will engage within the recess of the first ramp 204b somewhere along the side-to-side width of the first ramp 204b. The excess width of the first ramp 204b thereby allows the interfacing device to accommodate (operatively engage with) a variety of wheelchairs that have differing side-to-side spacing of front casters. In some embodiments, the first ramp 204a can be wider than the first ramp 204b (i.e., the reverse of the depicted arrangement). In the depicted embodiment, the second pair of ramps 206a-b are the same width. In some embodiments, the second pair of ramps 206a-b have differing widths.

In the depicted example of interfacing device 200, the first pair of ramps 204a-b are arranged between a first pair of the four casters 201, and the second pair of ramps 206a-b are arranged between a second pair of the four casters 201. Alternatively, in some embodiments the casters 201 can be positioned in different arrangements in comparison to the ramps 204a-b and/or 206a-b.

Figure 10:
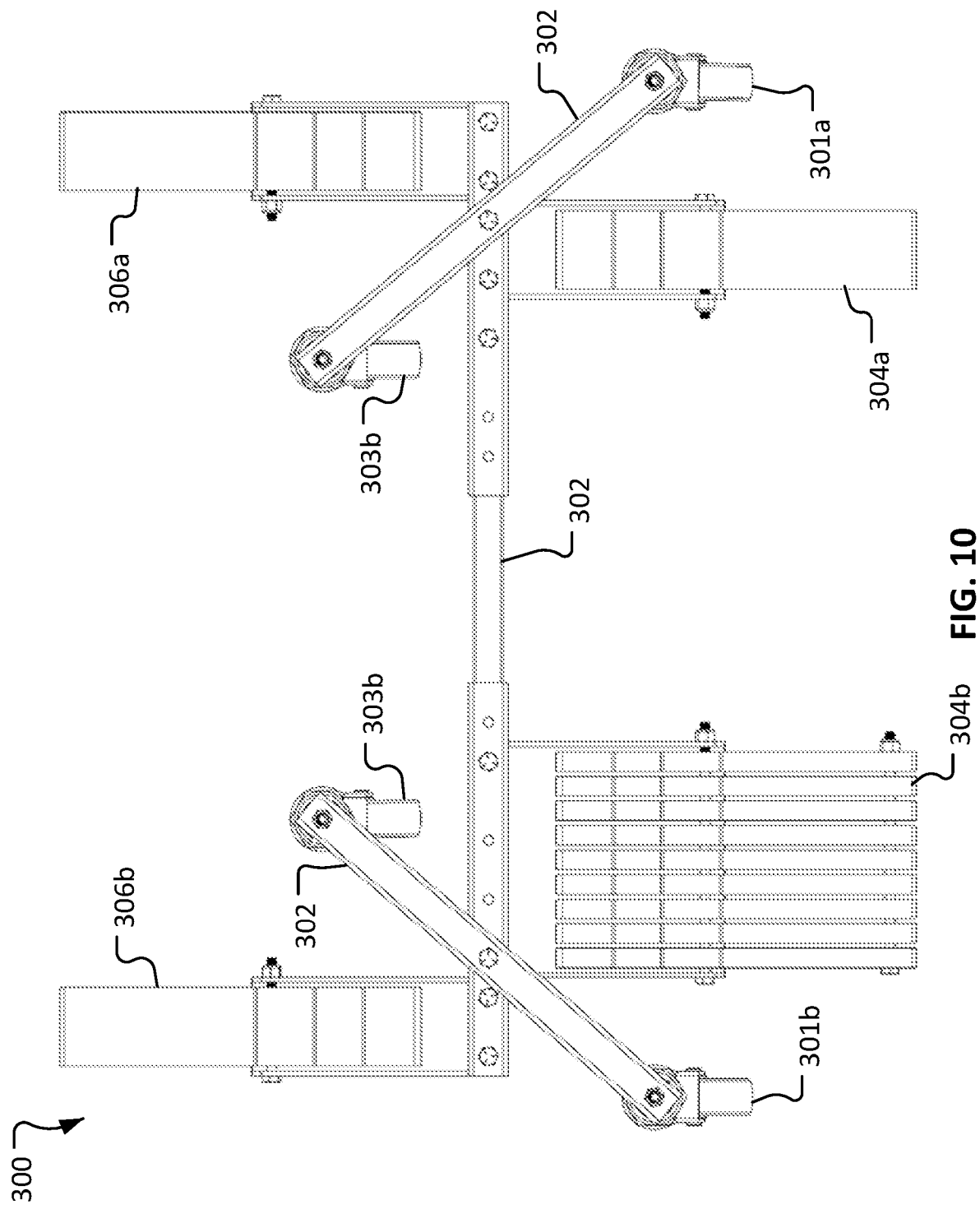
FIG. 10 is a top view of another example interfacing device in accordance with some embodiments.

Referring to FIG. 10, another example interfacing device 300 is depicted. The wheeled apparatus 140 can be engaged with the interfacing device 300. This interfacing device 300 is different from the interfacing device 200 described above in that the casters are arranged differently in comparison to the ramps. That is, while the first pair of ramps 304a-b are arranged between the first pair of casters 301a-b, the second pair of casters 303a-b are arranged between the second pair of ramps 306a-b. This arrangement can serve to advantageously reduce the overall side-to-side width of the interfacing device 300 in some cases. Such a reduced width can be beneficial for getting into narrow aisles and the like.

Figure 11:
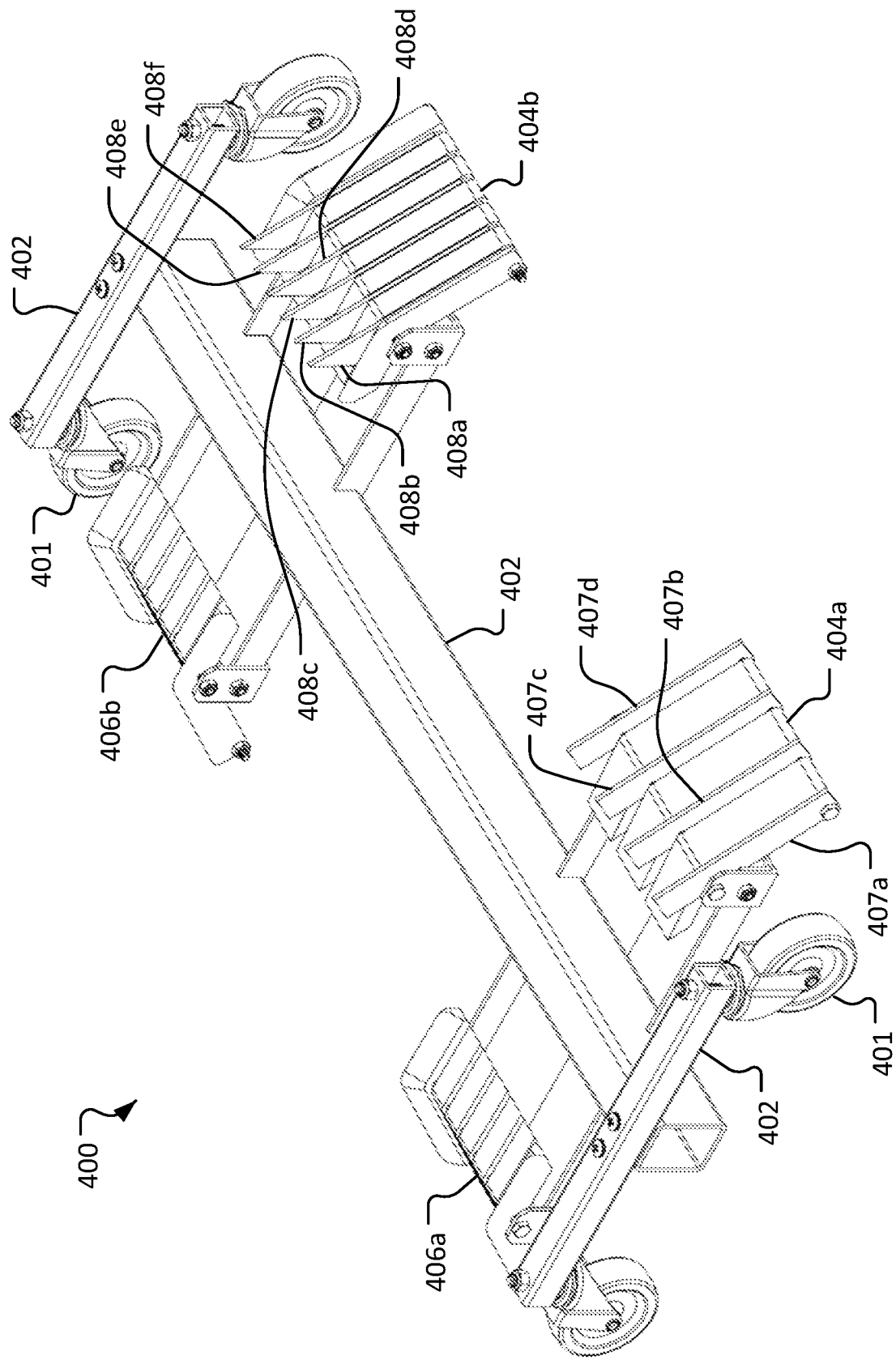
FIG. 11 shows a perspective view of another example interfacing device in accordance with some embodiments.
Figure 12:
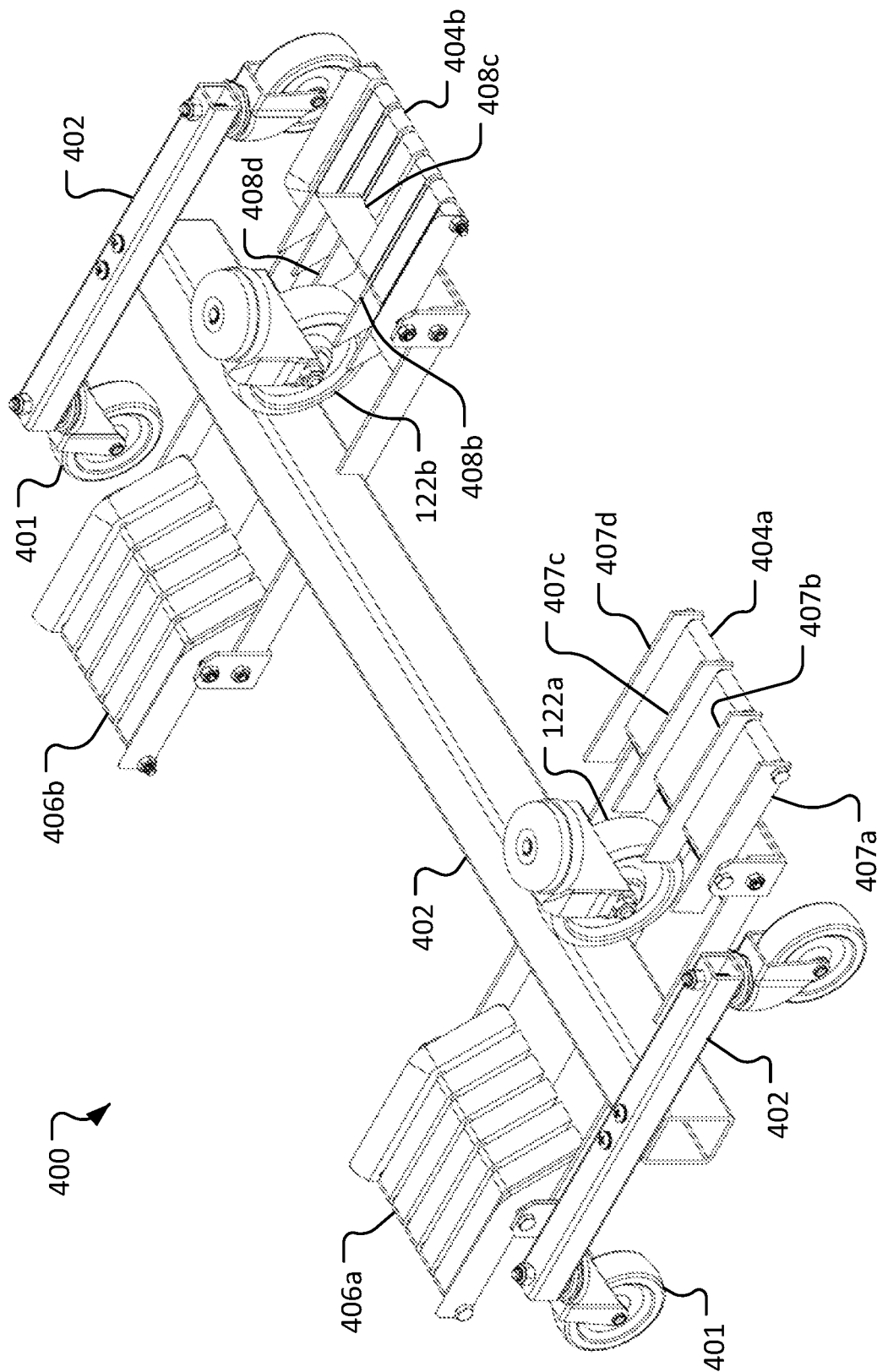
FIG. 12 shows the interfacing device of FIG. 11 engaged with the front casters of a wheelchair.

Referring to FIGS. 11 and 12, another example interfacing device 400 is depicted. The interfacing device 400 can include any/all of the features of the interfacing devices 200 and 300 as described above. In addition, the ramps 404a and 404b of the interfacing device 400 include side members that laterally constrain the front casters 122a and 122b of the wheelchair 120, as shown in FIG. 12 (where just the front casters 122a and 122b of the wheelchair 120 are depicted for simplicity).

In the depicted embodiment, the ramp 404a includes side members 407a, 407b, 407c, and 407d that are each fixed to the other portions of the ramp 404a. Accordingly, as can be seen by comparing FIG. 11 to FIG. 12, the side members 407a-d pivot along with the other portions of the ramp 404a.

The side members 407a-d extend into the recess region of the ramp 404a where the caster 122a comes to rest. Those portions of the side members 407a-d that extend into the recess region laterally constrain the caster 122a while the caster is in the recess, as can be seen in FIG. 12 (e.g., where the caster 122a is depicted as laterally constrained between adjacent side member 407b and 407c). Accordingly, while the ramp 404a can accommodate various lateral locations of the caster 122a (actually, three distinct lateral locations in the depicted embodiment), the side members 407a-d serve to laterally capture the caster 122a in between two adjacent side members (e.g., between adjacent side members 407a and 407b, or between adjacent side members 407b and 407c, or between adjacent side members 407c and 407d) so that the caster 122a cannot move laterally. While the ramp 404a is depicted as having three distinct lateral locations that can accommodate the caster 122a, it should be understood that in some embodiments the ramp 404a can have one, two, four, five, six, seven, eight, nine, ten, or more than ten distinct lateral locations that can accommodate the caster 122a.

The ramp 404b also includes side members that laterally constrain the front caster 122b of the wheelchair 120. In the depicted embodiment, the ramp 404b includes six side members 408a, 408b, 408c, 408d, 408e, and 408f. In the depicted embodiment, the side members 408a-f are different from the side members 407a-d in that the side members 408a-f are pivotable in relation to the other portions of the ramp 404b. For example, it can be seen in FIG. 12 that the side member 408c has pivoted in relation to the ramp 404b, and in relation to the other side members 408a, 408b, and 408d-f.

The side members 408a-f are also different than the side members 407a-d in that the lateral spacing between the side members 408a-f is less than the lateral spacing between the side members 407a-d. For example, while the caster 122a could fit between two adjacent side members 407a-c, the same sized caster 122b cannot fit between two adjacent side members 408a-f. Accordingly, the caster 122b forces one of the side members 408a-f to pivot in relation to the ramp 404b, and in relation to the other side members, when the caster 122b becomes positioned in the recess of the ramp 404b. In the depicted example, the caster 122b is laterally constrained between side member 408b and 408d (with the caster 122b causing the pivoting of side member 408c).

This arrangement of the ramps 404a and 404b, with their respective types of side members (i.e., side members 407a-b and 408a-f respectively) allows the interfacing device 400 to function well with wheel chairs having a variety of lateral front caster spacing dimensions, while providing lateral constraint of the front casters.

In some embodiments, the ramps 406a and/or 406b can also include side members like the side members 407a-b and/or 408a-f.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A device for interfacing a wheelchair with another wheeled apparatus, the device comprising:
   a frame;
   at least two casters attached to the frame; and
   at least two ramps pivotably attached to the frame,
   wherein each ramp of the at least two ramps defines a recess that can receive and retain a circular wheel,
   wherein each ramp of the at least two ramps includes a planar surface,
   wherein each ramp of the at least two ramps is pivotably attached to the frame along a respective pivot axis, and
   wherein the respective pivot axis of each of the at least two ramps is located between the planar surface and the recess of each of the at least two ramps.

2. The device of claim 1, wherein the at least two casters comprise four casters.

3. The device of claim 2, wherein the at least two ramps are arranged between a first pair of the four casters.

4. The device of claim 2, wherein the at least two ramps consist of a first pair of ramps that are arranged between a first pair of the four casters, and wherein a second pair of ramps are arranged between a second pair of the four casters.

5. The device of claim 1, wherein one ramp of the at least two ramps is wider than the other ramp of the at least two ramps.

6. The device of claim 1, wherein each ramp of the at least two ramps is the same width.

7. The device of claim 1, wherein a width of the frame is adjustable.

8. The device of claim 1, wherein a position of one or more ramps of the at least two ramps is adjustable relative to the frame.

9. A device for interfacing a wheelchair with another wheeled apparatus, the device comprising:
   a frame;
   at least two casters attached to the frame; and
   at least two ramps pivotably attached to the frame,
   wherein one ramp of the at least two ramps is wider than the other ramp of the at least two ramps.

10. The device of claim 9, wherein the at least two casters comprise four casters.

11. The device of claim 10, wherein the at least two ramps are arranged between a first pair of the four casters.

12. The device of claim 10, wherein the at least two ramps consist of a first pair of ramps that are arranged between a first pair of the four casters, and wherein a second pair of ramps are arranged between a second pair of the four casters.

13. The device of claim 9, wherein each ramp of the at least two ramps defines a recess that can receive and retain a circular wheel.

14. The device of claim 13, wherein each ramp of the at least two ramps includes a planar surface, wherein each ramp of the at least two ramps is pivotably attached to the frame along a respective pivot axis, and wherein the respective pivot axis of each of the at least two ramps is located between the planar surface and the recess of each of the at least two ramps.

15. The device of claim 9, wherein each ramp of the at least two ramps is the same width.

16. The device of claim 9, wherein a width of the frame is adjustable.

17. The device of claim 9, wherein a position of one or more ramps of the at least two ramps is adjustable relative to the frame.

* * * * *